United States Patent [19]

Scheurenbrand et al.

[11] Patent Number: 4,518,091
[45] Date of Patent: May 21, 1985

[54] MOTOR VEHICLE FUEL TANK

[75] Inventors: Dieter Scheurenbrand, Ostfildern; Manfred Stotz, Aichwald; Manfred Distel, Ostfildern; Einhard Kleinschmit, Esslingen, all of Fed. Rep. of Germany

[73] Assignee: Daimler-Benz Aktiengesellschaft, Fed. Rep. of Germany

[21] Appl. No.: 483,594

[22] Filed: Apr. 11, 1983

Related U.S. Application Data

[63] Continuation of Ser. No. 215,844, Dec. 12, 1980, abandoned.

[30] Foreign Application Priority Data

Dec. 12, 1979 [DE] Fed. Rep. of Germany ....... 2949900

[51] Int. Cl.³ ............................. B65D 6/32; B65D 6/38
[52] U.S. Cl. ....................................... 220/5 A; 220/72
[58] Field of Search ............... 220/5 R, 5 A, 1 U, 72, 220/86 R

[56] References Cited

U.S. PATENT DOCUMENTS

| | | | |
|---|---|---|---|
| 2,138,104 | 11/1938 | Kellogg | 220/86 R |
| 2,208,621 | 7/1940 | Ball | 220/1 U |
| 2,806,622 | 9/1957 | Leirer | 220/5 A |
| 3,071,287 | 1/1963 | Gran | 220/86 R |
| 3,246,795 | 4/1966 | Stubbs | 206/509 |
| 3,297,194 | 1/1967 | Schaper | 220/72 |
| 3,473,687 | 10/1969 | Larsen | 220/5 A |
| 3,547,299 | 12/1970 | Kepple | 220/72 |
| 3,794,203 | 2/1974 | Baumann | 220/5 A |

Primary Examiner—George E. Lowrance
Attorney, Agent, or Firm—Craig & Burns

[57] ABSTRACT

A fuel tank, especially for motor vehicles, includes two shaped shells which include a shell bottom, shell walls and a continuous shell rim, the shell rims of the shaped shells being adapted to be welded together to thereby form a composite fuel tank structure. At least one of the bottoms of one of the shaped shells which forms one of the side walls of the composite fuel tank structure is provided with reinforcing ribs and an outwardly protruding bulge. Additionally, the bottom of the composite tank structure formed by a wall of one of the shaped shells includes a bulge. The bulges form flexurally soft deformation zone extending generally at right angles to the reinforcing ribs and generally parallel to a portion of the shell rim which extends generally parallel to the bottom of the composite tank for absorbing stresses.

11 Claims, 2 Drawing Figures

MOTOR VEHICLE FUEL TANK

This is a continuation of application Ser. No. 215,844, filed Dec. 12, 1980, now abandoned.

BACKGROUND OF THE INVENTION

The present invention relates to a fuel tank and, more particularly, to a fuel tank for a motor vehicle which includes two shaped shells. Each of the shaped shells includes a shell bottom, shell walls, and a continuous circumferential shell rim. The shell rims of each shaped shell are adapted to be abutted and welded together thereby forming a closed fuel tank or cell. At least one of the shaped shells utilized in the formation of the fuel tank includes reinforcing ribs which are arranged, with respect to their direction, generally perpendicularly relative to a rim portion extending generally parallel to the bottom of the composite structure forming the fuel tank.

Fuel tanks are typically under a compressive and weight load due to the fluid accommodated in the tank, the result of which leads to stresses in the container wall or walls, particularly, during acceleration and braking of the motor vehicle. Pressure fluctuations are produced in the tank by the fuel causing additional stresses in the tank walls. Thus, stress peaks are created by an overlapping or super position of stresses, the highest of which is at or near the bottom of the tank, and which may cause undesirable deformation of the tank walls. Historically, the approach has been to construct the fuel tank in a manner such that the tank walls are form rigid and dimensionally stable so that stresses are absorbed by the tank walls.

In prior art fuel tanks which are generally of the aforementioned type, i.e., of two form rigid formed shell-like parts welded together along complementary rims, an uneven or non-uniform stress distribution occurs in the shell walls proximate the bottom area of the composite tank and in the welded seam when the fuel tank contains a substantial quantity of fuel therein. This usually is due to the existence of reinforcing ribs arranged in the shell-like parts, as a result of which the walls are deformed, leading to the formation of cracks because of the occurrence of shear forces, in an area between the shell walls and the rigid welded seam.

An approach to preventing the formation of cracks and the deformation of the shell walls has been to provide a wall thickness for the tank which would be sufficient to absorb the stress peaks. However, this approach typically results in a massive fuel tank which requires a considerable amount of material having a considerable weight.

Another previous approach to the above-identified problem has been to provide fuel tanks with straps which in turn lend stability to the tank. While it is understood that straps will in fact reduce the deformation of the walls of the tank, it is also understood that such an approach requires additional assembly and consequently additional expenditure.

SUMMARY AND OBJECTS OF THE INVENTION

It is an object of the present invention to provide a fuel tank, generally of the aforementioned type, which possesses a good stability together with a low inherent weight. This is achieved by the fuel tank of the instant invention wherein at least one of the walls of the formed shells forms a portion of the tank bottom and extends transversely to reinforcing ribs and a deformation zone is included which is flexurally soft with respect to an axis extending generally parallel to a portion of the respective shaped shell rim. Because of this flexurally soft deformation zone, the shell walls are able to deform in the bottom area of the tank, under loads, in such a manner that stress peaks cannot be effective within this area. Thus, the walls of the fuel tank can be constructed of thinner material than the walls in conventional fuel tanks and the fuel tank can be thus manufactured with considerable savings both in material and weight without sacrificing the requirement that the tank be rubbed and dependable.

The deformation zone of a fuel tank constructed in accordance with the principals of the instant invention is constructed in such a manner that upon deformation of the deformation zone, other portions of the vehicle are not contacted by the fuel tank. Moreover, any additional mounting of straps serving for reinforcement purposes is unnecessary.

In accordance with further advantageous features of the present invention, it is appropriate if the deformation zone extends generally over the entire width of the respective formed shell wall. Ideally, the deformation zone is constructed as a channel-like bulge whereby the stresses are uniformly distributed over the entire width of the respective shaped shell wall.

Accordingly, it is an object of the present invention to provide fuel tanks for motor vehicles which avoids, by simple means, the aforementioned shortcomings and disadvantages encountered in the prior art.

Another object of the present invention resides in providing fuel tanks for motor vehicles which are capable of absorbing stress peaks without permanent deformation of the tank and without affecting the welded seam.

Yet another object of the present invention resides in providing fuel tanks for motor vehicles which avoids the formation of cracks in the walls thereof by the absorption of stresses therein.

A further object of the present invention resides in providing fuel tanks for motor vehicles which have good stability and dependability coupled with low weight.

A still further object of the present invention resides in providing fuel tanks for motor vehicles which are simple in construction and therefore relatively inexpensive to manufacture.

These and other objects, features and advantages of the present invention will become more apparent from the following description when taken in connection with the accompanying drawing which shows for purposes of illustration only, one embodiment in accordance with the present invention, and wherein:

DESCRIPTION OF THE PREFERRED EMBODIMENT

Figure 1:
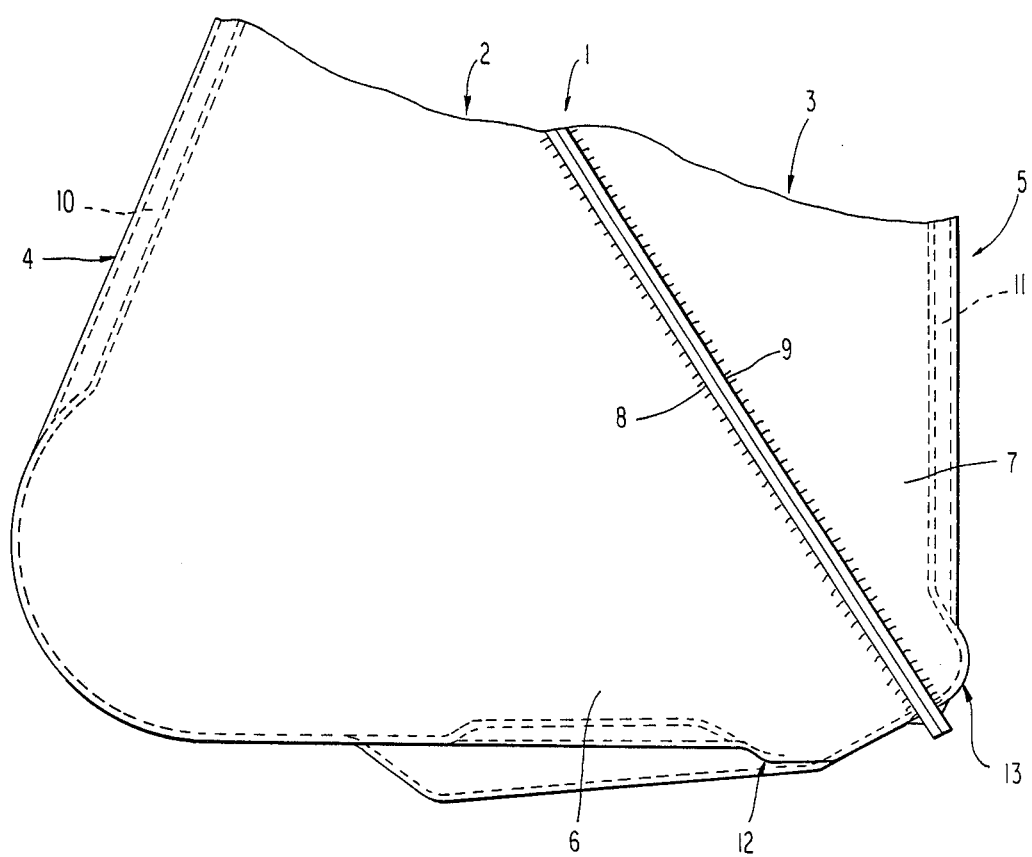
FIG. 1 is a partial side view of a lower portion of a fuel tank constructed in accordance with the principals of the present invention.
Figure 2:
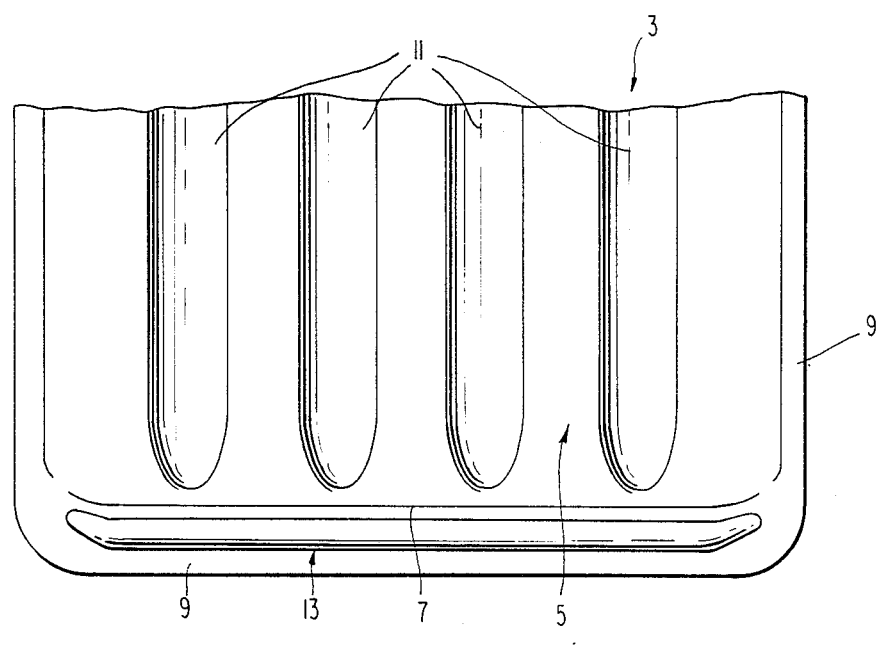
FIG. 2 is a partial elevational view of the upper shaped shell of the fuel tank of FIG. 1.

Referring now to the drawings wherein like reference numerals are used in both views to designate like parts and, more particularly, to FIG. 1, wherein according to this figure, a fuel tank generally designated by reference numeral 1 includes two generally parallelepiped shaped shells, namely a lower shaped shell generally designated by the reference numeral 2 and an upper shaped shell generally designated by the reference 3. Each of the shaped shells 2 and 3 includes a shell bottom generally designated by reference numerals 4 and 5 and shell walls 6 and 7, respectively. Each of the shaped shells 2 and 3 includes a continuous peripheral shell rim 8 and 9, respectively, along which the two shaped shells 2 and 3 are welded together. Each shaped shell bottom 4 and 5 is respectively provided with a plurality of reinforcing ribs 10 and 11 arranged at a mutual spacing and which extend generally upwardly and away from the bottom of the composite tank structure. As seen in the drawings, the reinforcing ribs 11, i.e., the ribs associated with shaped shell 3 and the ribs 10, i.e., the ribs associated with the shaped shell bottom 2, extend generally upwardly and away from the bottom of the composite tank structure 1. As is clearly evidenced in FIG. 1, a portion of a wall of shaped shell 2 forms the major portion of the bottom of the composite tank structure 1 and a portion of welded together rims 8 and 9 extends generally obliquely from an upper end to a lower end of the composite fuel tank 1.

The wall of the shaped shell 3 includes a channel-like bulge 13. This bulge 13 has reinforcing ribs 11 associated therewith and extends generally transversely of reinforcing ribs 11. The wall of shaped shell 2 which forms the bottom wall of the composite tank includes another channel-like bulge 12. The channel-like bulges 12 and 13 are arranged so as to be disposed on either side of the portion of the welded seam formed by shell rims 8 and 9 which is generally parallel to the bottom of the composite tank. These channel-like bulges form zones of deformation which will absorb stresses directed thereto. As is clearly evident from FIG. 1, reinforcing ribs 11, ideally, extend to and are faired into the transversely extending channel-like bulge 13. Reinforcing ribs 10, extending in shaped shell bottom 4, extend down to a radiused corner disposed between the shaped shell wall portion which forms the bottom of the composite tank structure and the shaped shell bottom 4.

Referring now to the zone of deformation created by the channel-like bulge 13, as best seen in FIG. 1, stresses translated from the shaped shell bottom 5, reinforced by ribs 11, to the zone of deformation, will be absorbed due to the inherent flexibility of the material and the outwardly projecting arrangement and disposition of the channel-like bulge 13. Accordingly, deleterious results from stresses and stress peaks will be avoided in the area of the welded together shell rims near the bottom of the composite tank structure 1. Thus stress cracks and permanent deformation of the tank is likewise avoided.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A composite fuel tank for motor vehicles, comprising two shaped shells each having a shell bottom adjoined by shell walls, each of said two shaped shells being provided with circumferential shell rim means along which the two shells are welded together, said welded together shell rim means forming a seam extending upwardly from a bottom area to a top area of the composite fuel tank, said seam including a portion extending generally parallel to and spaced from the bottom area of the composite tank, each said shell bottom forming one of two side walls in an installed composite fuel tank, at least one shell bottom having reinforcing means extending and tapering generally toward the bottom of the fuel tank, one of the shell walls forming at least part of a bottom wall of the composite fuel tank and extending substantially transversely to the reinforcing means, channel-like outwardly extending bulge means extending generally transversely to said reinforcing means for forming a deformation zone, said bulge means being associated with ends of the reinforcing means and disposed proximate and generally parallel to the portion of the seam extending substantially parallel to the bottom area of the composite tank, wherein stresses in said tank due to fuel contained therein and transmitted to said deformation zone, will be absorbed thereby.

2. A composite fuel tank according to claim 1, wherein said deformation zone extends generally over the entire width of the at least one shell bottom.

3. A composite fuel tank according to claim 2, wherein the channel-like bulge means is convexly shaped as viewed from the outside of the tank.

4. A composite fuel tank according to claim 3, wherein the reinforcing means includes a plurality of mutually spaced reinforcing ribs.

5. A composite fuel tank according to claim 4, wherein a channel-like bulge means is provided each of the two shells.

6. A fuel tank according to claim 1, wherein a channel-like bulge means is provided in each of the two shaped shells.

7. A composite fuel tank for motor vehicles having two shell-like parts welded together along complementary circumferentially extending rims provided on each shell-like part to thereby form a seam, each shell-like part including a shell bottom and shell walls adjoining the shell bottom, said seam of the composite fuel tank extending diagonally from top to bottom and having a portion extending substantially parallelly to and spaced from a bottom area of the tank, each shell bottom forming a side wall of the composite tank and at least one side wall of the composite tank including a plurality of mutually spaced reinforcing ribs, the shell bottom forming said at least one side wall including an outwardly extending bulge means creating a deformation zone for absorbing stresses created by fuel in said tank disposed proximate the portion of the seam extending substantially parallelly to the bottom area of the fuel tank, said bulge means extending generally transversely to and disposed proximate to ends of the reinforcing ribs.

8. A composite fuel tank according to claim 1, wherein said deformation zone extends generally over the entire width of said at least one side wall of the composite tank.

9. A composite fuel tank according to claim 8, wherein a channel-like bulge means is provided in each of the two shaped shells.

10. A composite fuel tank according to claim 9, wherein each channel-like bulge is convexly shaped as viewed from the outside of the assembled fuel tank.

11. A composite fuel tank according to claim 7, wherein a further bulge means is provided in a shell wall of the shell-like part which forms a part of the bottom area of the composite fuel tank, said further bulge means being provided within the area of the fuel tank bottom near the parallelly extending portion of the seam.

* * * * *